US005299489A

United States Patent [19]

Obrecht et al.

[11] Patent Number: 5,299,489

[45] Date of Patent: Apr. 5, 1994

[54] PRESSURE CYLINDER WITH LOW TOLERANCE FIT CAPABLE OF SUPPORTING LARGE TRANSVERSE LOADS

[75] Inventors: Robert E. Obrecht, Bloomfield Hills; Edward J. Waltonen, Southfield, both of Mich.

[73] Assignee: REO Hydraulic Pierce & Form, Detroit, Mich.

[21] Appl. No.: 948,451

[22] Filed: Sep. 21, 1992

Related U.S. Application Data

[63] Continuation of Ser. No. 701,763, May 17, 1991, abandoned.

[51] Int. Cl.[5] ........................ F16J 15/18; F01B 25/26; F01B 15/02

[52] U.S. Cl. .......................................... 92/5 R; 92/31; 92/88; 92/110; 92/117 A; 92/165 R; 92/165 PR

[58] Field of Search ........................ 92/5 R, 31, 51, 52, 92/88, 107, 116, 136, 139, 117 R, 117 A, 165 PR, 165 R; 91/1

[56] References Cited

U.S. PATENT DOCUMENTS

| | | | |
|---|---|---|---|
| 67,719 | 8/1867 | Burr . | |
| 1,788,298 | 1/1931 | Hottel | 92/107 X |
| 2,183,983 | 12/1939 | Bostwick . | |
| 2,765,778 | 10/1956 | Gerry et al. | 92/165 PR |
| 3,008,032 | 11/1961 | Wolfbauer, Jr. . | |
| 3,166,991 | 1/1965 | Blenkle | 92/117 R X |
| 3,270,604 | 9/1966 | Waltonen . | |
| 3,396,260 | 8/1968 | Waltonen . | |
| 3,563,136 | 2/1971 | Valente | 91/519 |
| 3,592,108 | 7/1971 | Rosaen | 92/52 X |
| 4,098,161 | 7/1978 | Bloch . | |
| 4,273,031 | 6/1981 | Hannon | 92/88 |
| 4,397,175 | 8/1983 | Shear . | |
| 4,419,878 | 12/1983 | Fusser . | |
| 4,442,694 | 4/1984 | Fusser et al. . | |
| 4,533,301 | 8/1985 | Foster | 92/31 X |
| 4,716,803 | 1/1988 | Waltonen | 83/529 |
| 4,726,282 | 2/1988 | LaBair | 92/5 R |
| 4,760,633 | 8/1988 | Dacey, Jr. . | |
| 4,763,550 | 8/1988 | Waltonen et al. . | |
| 4,793,241 | 12/1988 | Mano et al. | 91/1 X |
| 4,838,146 | 6/1989 | Stoll | 92/165 PR X |
| 5,003,864 | 4/1991 | Dyer | 92/136 X |
| 5,172,625 | 12/1992 | Latham | 92/165 R |

FOREIGN PATENT DOCUMENTS

| | | | |
|---|---|---|---|
| 479885 | 7/1929 | Fed. Rep. of Germany . | |
| 46-33454 | 9/1971 | Japan | 91/216 R |
| 55-103250 | 7/1980 | Japan . | |
| 86210 | 7/1981 | Japan | 92/117 A |

*Primary Examiner*—Edward K. Look
*Assistant Examiner*—John Ryznic
*Attorney, Agent, or Firm*—Krass & Young

[57] ABSTRACT

A pressure cylinder in which the piston is hollow and the pressurized fluid is introduced into the hollow of the piston. The cylinder housing includes a core member with supply and exhaust ports. An area between the rear wall of the housing and a rear wall of the piston is exposed to atmospheric pressure at all times, elliminating a need for seals on the outside surface of the piston, and allowing for the piston to be exposed to large transverse forces. Proximity switches are provided in a slot in the upper wall of the cylinder housing to detect the arrival of the piston at its limit positions and a pin secured to the cylinder housing engages a slot in the outer periphery of the piston to guide the forward and rearward movement of the piston within the cylinder. A slot may be provided in the upper wall of the cylinder housing for receipt of a work positioning member secured to the outer periphery of the piston.

15 Claims, 4 Drawing Sheets

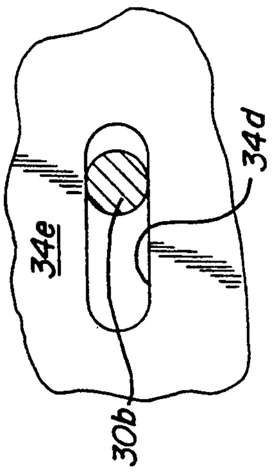
FIG-4
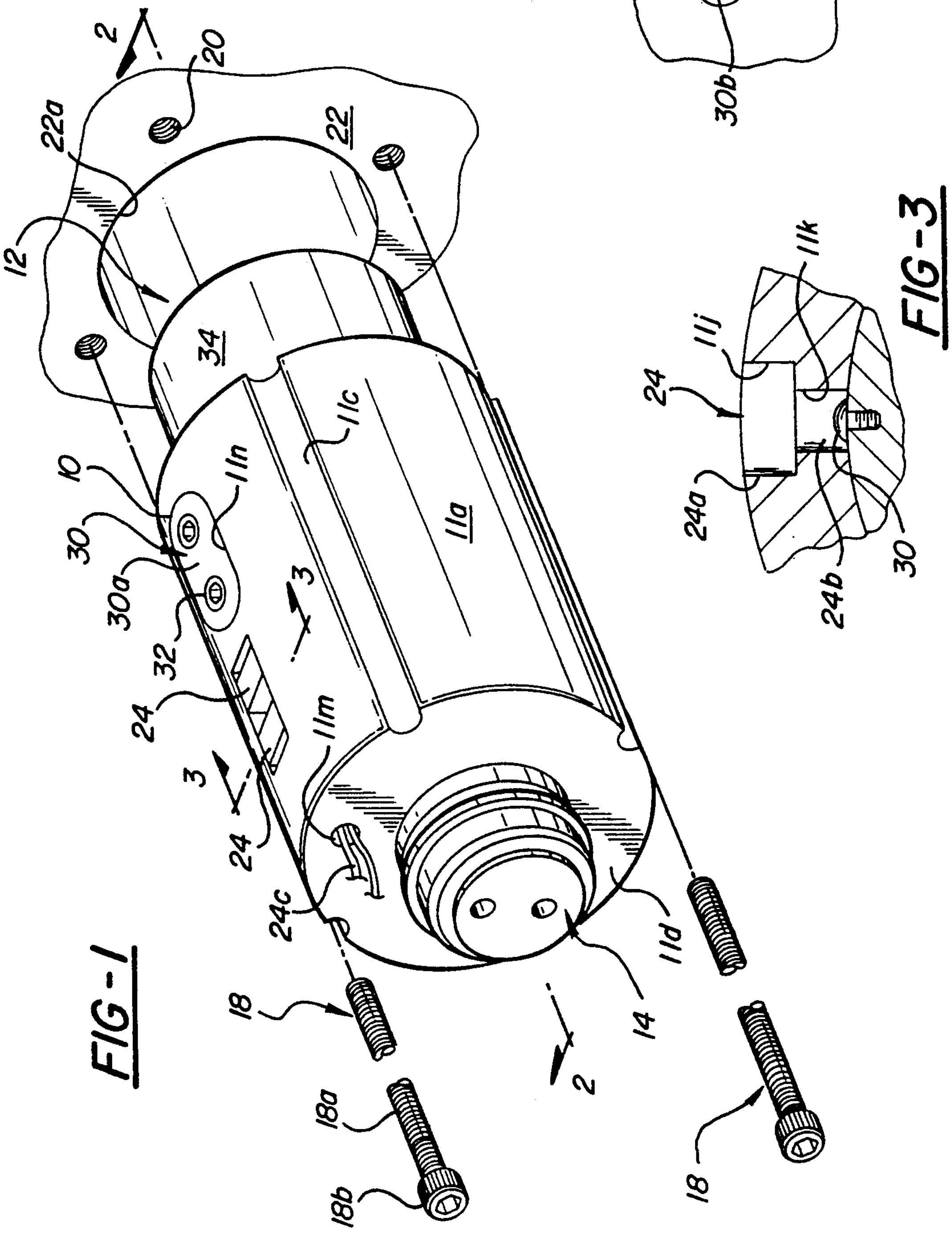
FIG-3
FIG-1

PRESSURE CYLINDER WITH LOW TOLERANCE FIT CAPABLE OF SUPPORTING LARGE TRANSVERSE LOADS

This is a continuation of co-pending application Ser. No. 701,763 filed on May 17, 1991, now abandoned.

BACKGROUND OF THE INVENTION

This invention relates to pressure cylinders and more particularly to a pressure cylinder of the hydraulic or pneumatic type in which a piston is movable within the bore of a cylinder housing to perform a work operation.

Pressure cylinders have been available for many years and have been employed in a multitude of work applications to perform a multitude of work operations. In a typical pressure cylinder, the cylinder housing defines an elongated bore, a piston is reciprocally mounted within the bore, and a piston rod extends from the piston and through an opening in the forward end wall of the cylinder housing to provide a free end of the piston rod which is available to perform the work operation.

Whereas pressure cylinders of this general type are generally satisfactory, they suffer from several disadvantages. Specifically, they are in general unable to handle offset loading on the piston rod because of the limited sliding interface between the piston and the bore of the cylinder housing; it is difficult to provide switches to determine the limits of the movement of the piston since it is necessary to seal the switches with respect to the pressure fluid contained within the bore of the cylinder housing; the rod seal at the interface of the piston rod and the forward end wall of the cylinder experiences heavy loading and as a result requires frequent replacement; the useful life of the rod seal is further limited by debris that is introduced into the seal by the reciprocal movement of the piston rod; in the case where the piston rod is used to raise a load the raised load must be propped up by auxiliary support means since the surface area of the piston rod is inadequate to provide a stable support for the raised load; and, for a given stroke, the overall height of the pressure cylinder tends to be rather long with the result that the cylinder cannot be utilized in situations where working space is limited.

SUMMARY OF THE INVENTION

This invention is directed to the provision of an improved pressure cylinder.

More specifically, this invention is directed to the provision of a pressure cylinder which has a low overhaul shut height; which can readily handle offset loading; which allows the provision of limit switches without requiring further fluid seals; which provides an extremely long seal life; and which eliminates the need for auxiliary supports to stabilize a load raised by the piston of the cylinder.

The pressure cylinder of the invention is of the type comprising a cylinder housing defining a blind bore opening in the front end of the housing and a piston having a cross-sectional configuration corresponding to the cross-sectional configuration of the bore and mounted for sliding movement in the bore in response to introduction of pressurized fluid into the bore between a retracted position and an extended position in which the front end of the piston extends outwardly beyond the front end of the bore. According to the invention, the piston defines a hollow and the pressurized fluid is introduced into the hollow of the piston. This arrangement eliminates any fluid seal at the interface of the piston and cylinder housing.

According to a further feature of the invention, coacting switch means are provided on the sliding periphery of the piston and on the cylinder housing. Since there is no fluid pressure at this interface, there is no need to seal the switches with respect to the pressurized fluid so that leakage problems are eliminated.

According to a further feature of the invention, coacting guide means are provided on the piston and on the cylinder housing which are operative to guide the sliding movement of the piston in the bore. Since there is no pressurized fluid present at the interface of the piston and the cylinder housing, there is no need to seal the guide means with respect to the pressurized fluid so that leakage problems are eliminated.

According to a further feature of the invention, a slot is provided in the cylinder housing opening in the bore and externally of the housing and a work positioning member is positioned in the slot and secured to the piston so as to move in the slot in response to sliding movement of the piston in the bore. This arrangement allows the piston to serve in the manner of a rodless piston to move a workpiece attached to the work positioning member along an axis generally parallel but offset from the central axis of the cylinder.

In one disclosed embodiment of the invention the cross-sectional configuration of the bore of the cylinder housing and of the piston is rectangular and in another disclosed embodiment the cross-sectional configuration of the bore and the piston is circular. In the circular configuration, the guide means may impart rotation to the piston as it moves axially in the bore with the rotation being accomplished by the engagement of a pin carried by the housing in a skewed slot provided in the outer periphery of the piston.

In both the circular and rectangular embodiments, the hollow piston includes a solid front end wall, solid side walls and a rear end wall defining an opening therein; a core member extends forwardly from the cylinder housing rear end wall with a rod portion of the core member extending through the opening in the rear end wall of the piston to dispose a radially enlarged piston portion of the core member within the hollow of the piston to divide the hollow of the piston into first and second pressure chambers each of variable volume; and passage means extend through the core member and open respectively in the first and second chambers so as to enable pressurized fluid to be delivered to one chamber while exhausting pressurized fluid from the other chamber and thereby move the piston relative to the cylinder to perform the work operation.

BRIEF DESCRIPTION OF THE DRAWINGS

FIG. 1 is a perspective view of a first embodiment of the invention pressure cylinder embodying a generally circular cross-sectional configuration;

FIGS. 2 and 3 are cross-sectional views taken respectively on lines 2—2 and 3—3 of FIG. 1;

FIG. 4 is a detail view of a portion of the pressure cylinder of FIG. 1;

DETAILED DESCRIPTION OF THE PREFERRED EMBODIMENTS

Figure 2:
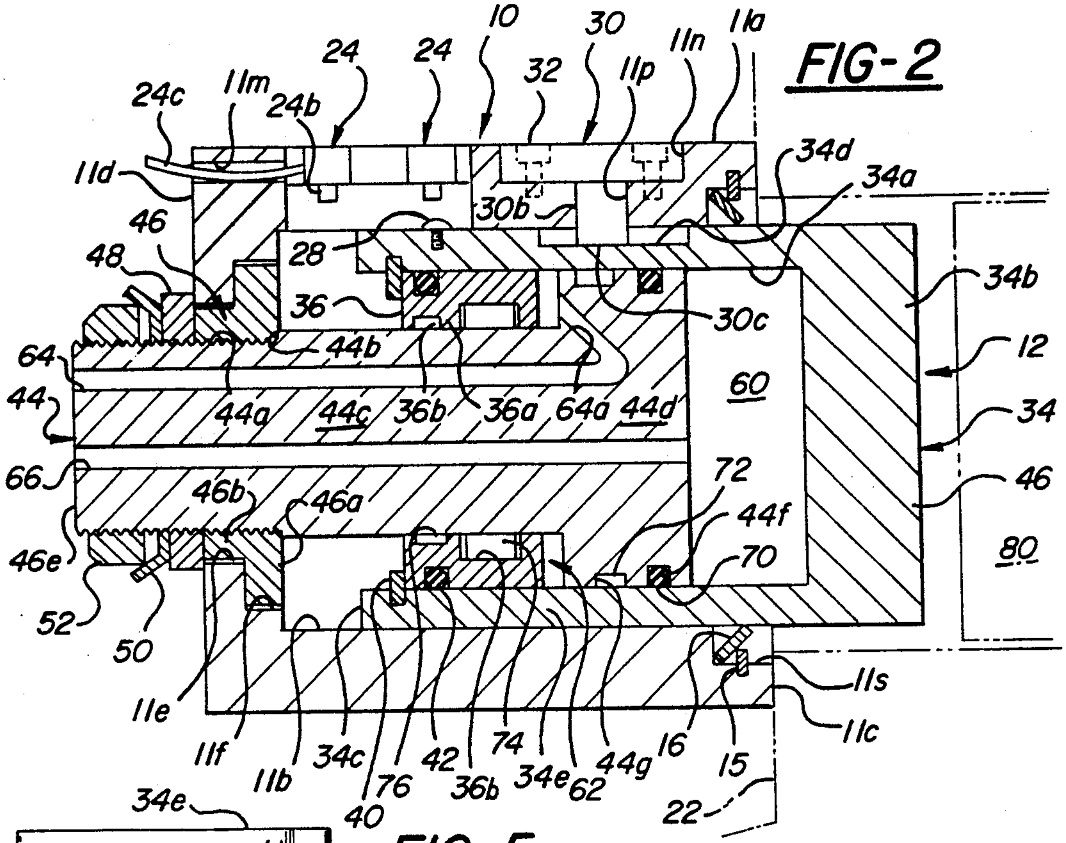

The pressure cylinder seen in FIGS. 1-4, broadly considered, includes a cylinder housing assembly 10, a piston assembly 12, and a core member assembly 14. All parts of the pressure cylinder, unless otherwise indicated, are formed of a suitable steel material.

Housing assembly 10 includes a cylinder housing 11. Housing 11 has a generally circular configuration and includes a main body cylindrical side wall portion 11*a* defining a central cylindrical blind bore 11*b* opening at the front end 11*c* of the housing and enclosed at its rear end by the rear end wall 11*d* of the housing. Rear end wall 11*d* includes a central opening 11*e* and a counterbore opening 11*f*. The front end 11*c* of the housing includes an annular recess 11*g* receiving a snap-ring 15 to mount a wiper seal 16 for wiping engagement with the outer periphery of the piston.

The outer periphery of main body side wall portion 11*a* includes a plurality of longitudinally extending, circumferentially spaced, outwardly opening grooves 11*c* extending from the front end to the rear end of the housing and sized to accommodate a respective plurality of mounting bolts 18 each including a threaded forward end portion 18*a* for threaded receipt in blind tapped holes 20 in a suitable mounting surface 22 with the heads 18*b* of the bolts serving to clamp the pressure cylinder between the bolt heads and the mounting face 22 to firmly secure the pressure cylinder to the mounting face 22 and dispose the piston 14 within a central opening 22*a* in the mounting face 22.

A longitudinal slot 11*j* opens in the outer periphery of cylinder main body 11*a* and communicates with a smaller diameter longitudinally coextensive lower slot 11*k* opening in the bore 11*b*. Slots 11*j* and 11*k* extend parallel to the central axis of the pressure cylinder and are sized to receive a pair of proximity switches 24. Switches 24 may comprise, for example, a conventional device such as is available from Namco Controls Division of Acme Cleveland of Cleveland, Ohio. Each switch 24 includes a main body portion 24*a* slidably mounted in slot 11*j* and a cylindrical probe or pickup 24*b* positioned slidably in slot 11*k* and coacting with a screw 28 screwed into the outer periphery of piston 12 in alignment with slot 11*k* so that the proximity switches 24 sense the position of the screw 28 and thereby of the associated piston 14. The probes 24*b* may be slidably adjusted in grooves 11*j* and 11*k* to vary the end limit positions detected by the sensors and leads 24*c* from the sensors extend through a bore 11*m* communicating with the slot 11*j* so that the leads 24*c* are accessible at the rear end of the cylinder. Switches 24 may provide a capacitive pickup, an inductive pickup, or a magnetic pickup including a Hall effect transducer.

A generally circular upwardly opening recess 11*n* is provided in housing main body 11*a* generally forwardly of slots 11*j* and 11*k* and a guide pin 30 is removably positioned in recess 11*n* with the generally circular head portion 30*a* of the pin positioned in the recess 11*n* and a shaft or pin portion 30*b* of the pin extending downwardly through an aperture 11*p* in housing side wall 11*a*. Pin 30 is removably mounted on the cylinder housing by screws 32.

Piston assembly 12 includes a piston 34 and an annular plug 36.

Piston 34 is cylindrical and hollow and defines a central cylindrical bore 34*a* extending rearwardly from the solid front end wall 34*b* of the piston and opening at the rear end 34*c* of the piston. Piston 34 has a cross sectional size and configuration generally corresponding to the cross sectional size and configuration of cylinder housing bore 11*b* and is slidably mounted in bore 11*b*. The lower end of pin portion 30*b* of pin 30 coacts with a longitudinally extending groove 34*d* in the outer periphery of the cylindrical side wall portion 34*b* of the piston to guide the piston in its reciprocal movement within housing bore 11*b*.

Annular plug 36 is sized to fit snugly within the open rear end 34*c* of piston 34 and is precluded from rearward movement relative to the piston by a snap-ring 40. An O-ring 42 seated in the outer periphery of plug 36 seals the interface between plug 36 and the bore 34*a* of piston 34.

Core assembly 14 includes a core member 44, a mounting collar 46, a washer 48, a lock washer 50, and a nut 52.

Core member 44 is circular in cross section and includes a threaded rear portion 44*a* terminating in an annular shoulder 44*b*, a central rod portion 44*c*, and a radially enlarged forward piston portion 44*d*.

Collar 46 is threaded onto the threaded rear end portion 44*a* of core member 44 against shoulder 44*b* and includes a large diameter forward portion 46*a* seated in housing bore 11*f* and a smaller diameter rearward portion 46*b* seated in housing bore 11*e*.

Washer 48 is fitted over the threaded rear portion 44*a* of the core member; lock washer 50 is fitted over core member rear portion 44*a* rearwardly of washer 48; and nut 52 is threaded onto core member rear portion 44*a* so as to mount the core member in the rear wall 11*d* of the housing 11*a* with the core member rod portion 44*c* projecting forwardly from the housing rear end wall and passing slidably through the central opening 36*a* of annular plug 36 to dispose radially enlarged piston portion 44*d* of the core member within the hollow of the piston and divide the piston hollow into a forward pressure chamber 60 and a rearward pressure chamber 62. A passage 64 in core member 44 extends axially of the core member and communicates at its forward end 64*a* with chamber 62 and a further passage 66, parallel to passage 64, extends forwardly through the core member to communicate with chamber 60. Both passages 64,66 open in the rear end face 44*e* of the core member where they may access suitable supply lines for pressurized hydraulic fluid.

A piston seal 70 is provided in a groove 44*f* in the piston portion 44*d* of the core member for sliding sealing engagement with piston bore 34*a*; a guide ring 72 is positioned in a groove 44*g* in the piston portion of the core member; a rod seal 74 is positioned in a groove 36*b* in annular plug 36 in sliding sealing engagement with core member rod portion 44*c*; and a guide ring 76 is positioned in a groove 36*b* in annular plug 36.

It will be seen that, with housing 11*a* firmly secured to mounting face 22 by the use of mounting screws 18, the admission of pressurized fluid to chamber 60 through passage 66 accompanied by the withdrawal of fluid from chamber 62 through passage 64 will result in the piston 34 moving forwardly in bore 10*b* to perform a work operation on a workpiece such as a workpiece 80 positioned in opening 22*a* of mounting face 22.

Conversely, it will be seen that the introduction of pressurized fluid into chamber 62 through passage 64 accompanied by the withdrawal of fluid from chamber 60 through passage 66 will result in the rearward movement of piston 34 in bore 10*b* to move the piston away from the workpiece 80.

As the piston moves forwardly and rearwardly in the bore 11*b* between its retracted and extended working positions, the position of the piston is at all times tracked by the proximity switches 24 with the arrival of the piston at its forward position detected by the forwardmost proximity switch 24 and the arrival of the switch at its rearwardmost position detected by the rearwardmost proximity switch 24 with the probe 24*b* of the switch in each case sensing the arrival of the screw 30 in a position proximate the respective probe so that the arrival of the piston at its forward and rearward positions is readily signaled via leads 24 extending from the rear face of the pressure cylinder assembly.

The forward and rearward movement of the piston 34 in the bore 11*b* is guided by the sliding engagement of pin portion 30*b* or pin 30 in groove 34*d* to preclude rotation of the piston as it moves forwardly and rearwardly in the cylinder housing. As the cylinder moves forwardly and rearwardly in bore 11*b*, wiper 16 operates to remove any surface debris from the outer periphery of piston 34 so as to preclude the entry of the debris into the interface between the piston and the bore of the cylinder.

Figure 5:
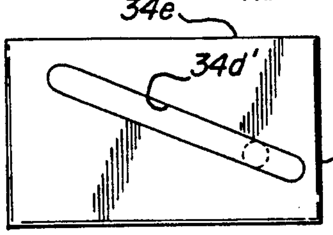
FIG. 5 is a view of a modified form of piston for use in the pressure cylinder of FIG. 1.

In the alternative piston construction of FIG. 5, the slot 34*d*' in the outer periphery of the piston 34 is skewed with respect to the longitudinal central axis of the piston so that a rotational movement is imparted to the piston 34 by the coaction of pin 30*b* and slot 34*d*' as the piston moves forwardly and rearwardly in the cylinder bore 10*b*.

Collar 46 preferably fits within bores 11*e* and 10*f* of the rear wall of the cylinder housing with a loose fit so as to allow the core member 44 to self align itself squarely within the central bore 34*a* of the piston in compensation for manufacturing tolerances.

Figure 6:
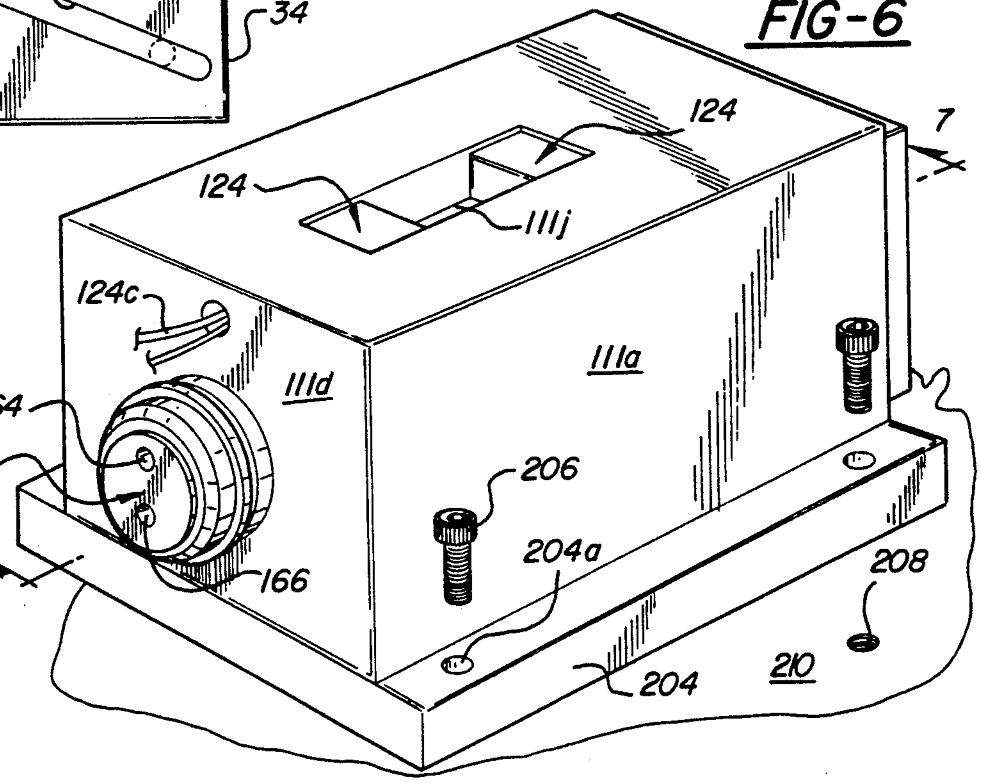
FIG. 6 is a perspective view of a second embodiment of the invention pressure cylinder embodying a generally rectangular cross sectional configuration.
Figure 8:
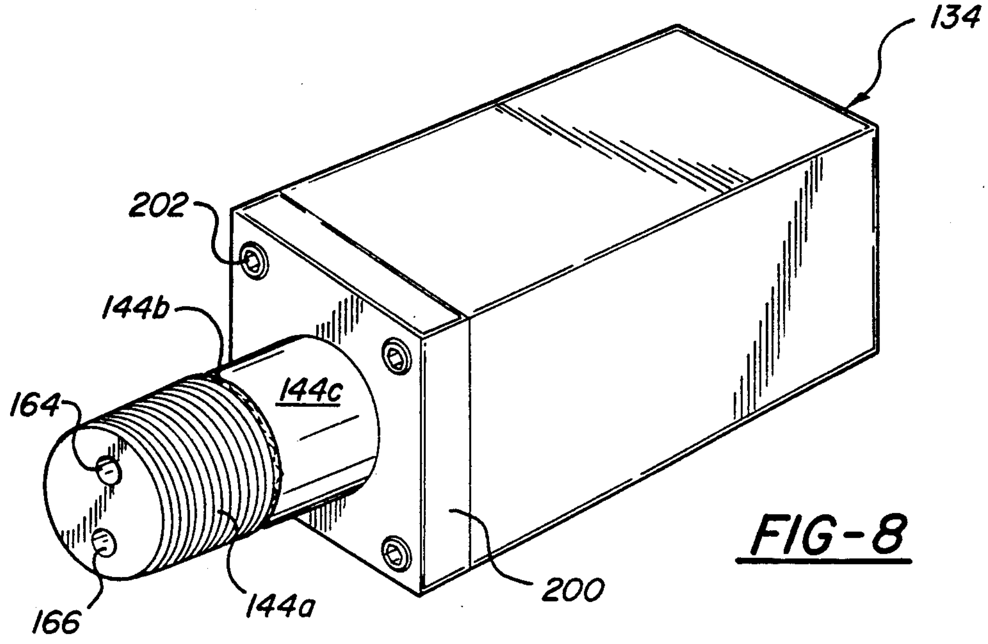
FIG. 8 is a perspective view of a piston and core member assembly utilized in the pressure cylinder of FIG. 6.
Figure 7:
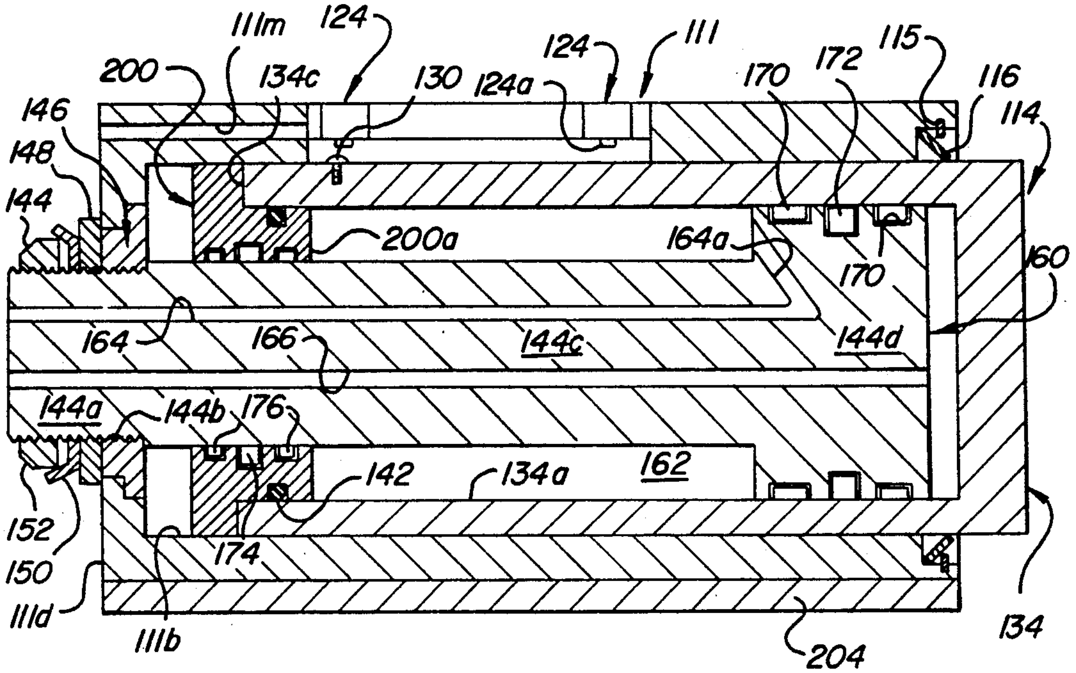
FIG. 7 is a cross-sectional view taken on line 7—7 of FIG. 6.

The pressure cylinder of the FIGS. 6–8 embodiment is generally similar to the cylinder of the 1–4 embodiment with the exception that the cylinder has a generally rectangular cross-sectional configuration. Elements in the FIGS. 6–8 embodiment that correspond generally to similar elements in the FIGS. 1–4 embodiment are given like reference numerals increased by 100.

Thus, rectangular piston 134 is mounted for reciprocal sliding movement in rectangular bore 111*b* of rectangular cylinder housing 111; the forward and rearward limits of the movement of the piston in the housing bore are detected by proximity switches 124,124 mounted in a groove 111*j* with the probes 124*b* of the switches coacting with a screw 130 in the outer periphery of the piston 134 to detect the arrival of the piston at its forward and rearward limits; pressure fluid is supplied through passage 164' in core member 144 to piston chamber 162 while withdrawing pressure fluid from piston chamber 160 to move the piston rearwardly in the bore 111*b* and pressure fluid is supplied through passage 166 to chamber 160 while removing fluid from chamber 162 through passage 164 to move the piston forwardly in the bore 111*b*; as the piston moves forwardly and rearwardly in the bore 111*b*, wiper seal 116 coacts with the outer periphery of the piston to remove debris from the piston and preclude the entry of the debris into the interface between the piston and the bore; piston seal 172 and guide rings 170 on piston portion 144*d* of core member 144 slidably coact with the bore 134*a* of the piston to seal chamber 160 from chamber 162; and a rod seal 174 coacts with the rod portion 144*c* of the core member to seal the piston chamber 162 from the rear end of the cylinder bore 111*b*.

In the FIGS. 6–8 embodiment, the annular plug 36 of the FIGS. 1–4 embodiment is constituted by the front annular circular portion 200*a* of a rectangular end plate 200 which is secured to the annular end edge 134*c* of piston 134 by bolts 202 with the annular circular portion 200*a* fitting telescopically into the bore 134*a* of the piston, and the anti-rotation assembly 30,34*d* of the FIG. 1–4 embodiment is eliminated since the rectangular configuration of the piston moving in the rectangular configuration of the cylinder bore precludes rotation of the piston. The mounting of the pressure cylinder of the FIGS. 6–8 embodiment is accomplished by a mounting flange 204 suitably secured to the lower face of the housing 111*a* and including mounting holes 204*a* for passage of mounting bolts 206 to mount the pressure cylinder in blind bores 208 in a suitable mounting surface 210 and thereby firmly secure the pressure cylinder to the mounting surface where it may coact with a workpiece to perform a suitable work operation. Alternatively, mounting flange 204 may be secured to the end wall 11*d* of the housing 111 (with a suitable opening provided for the rear end portion 144*a* of core member 144) to allow end mounting of the cylinder.

Figure 9:
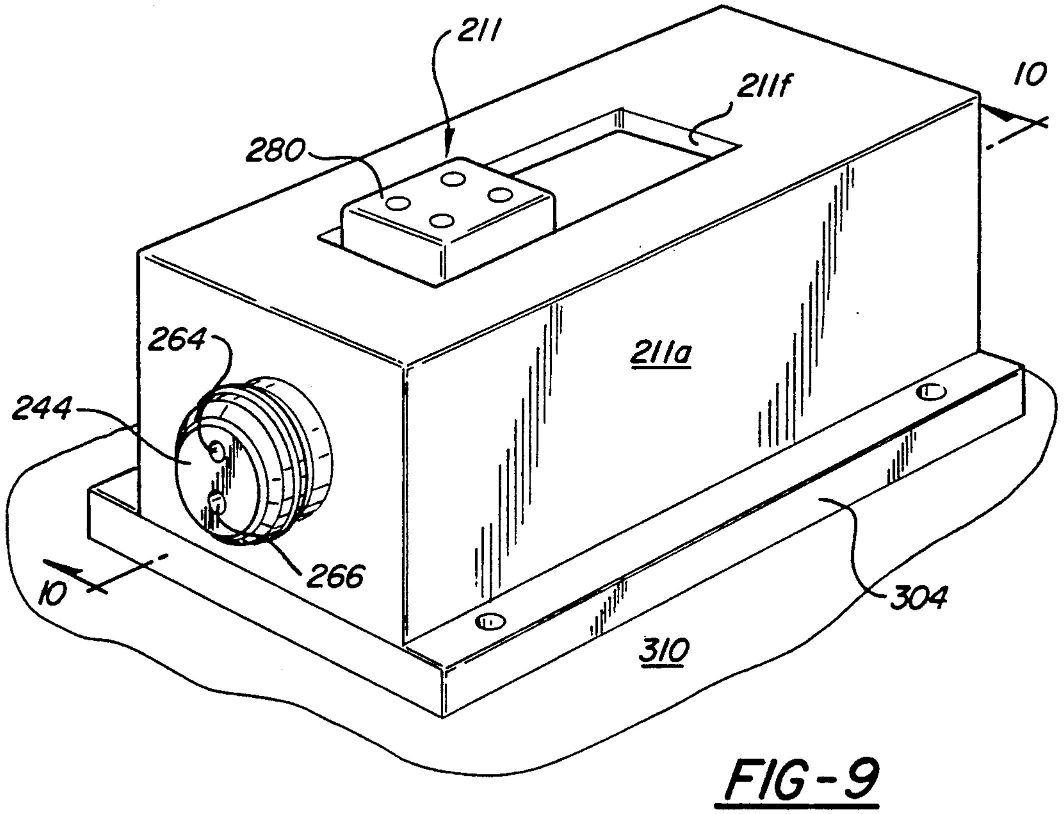
FIG. 9 is a perspective view of a third embodiment of the invention pressure cylinder.
Figure 10:
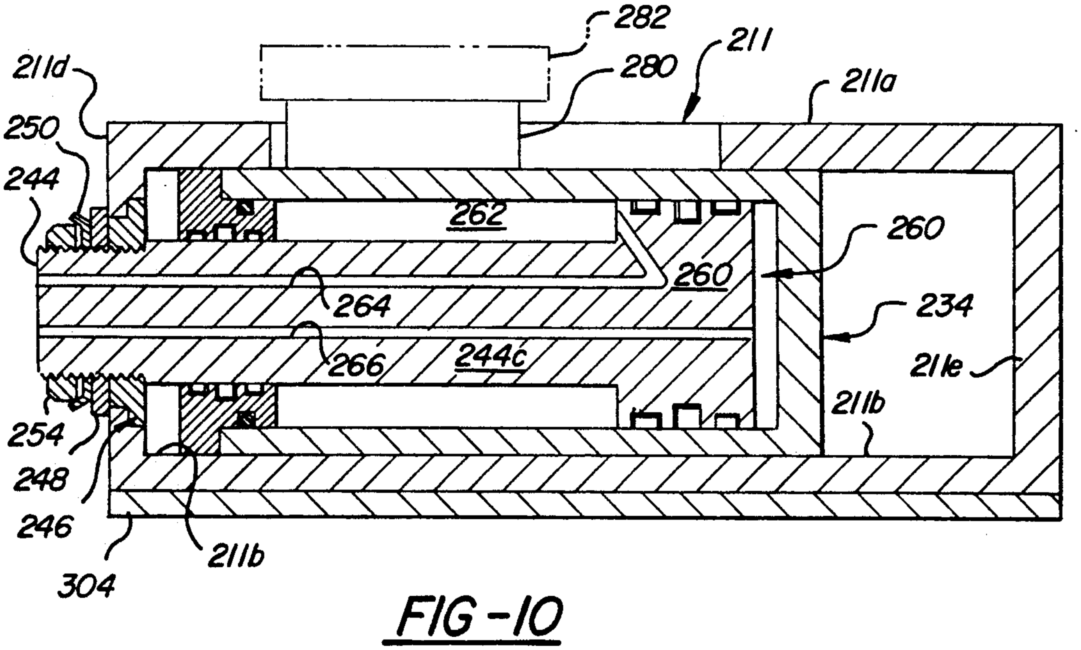
FIG. 10 is a cross-sectional view taken on line 10—10 of FIG. 9.

The embodiment of the invention pressure cylinder seen in FIGS. 9–10 is generally similar to the embodiment seen in FIGS. 6–8 and like elements are identified with like reference numerals with 100 added to the reference numerals of FIGS. 9–10 as compared to the like reference numerals of FIGS. 6–8.

Thus, with flange 304 suitably secured to a suitable support surface 310, when pressurized fluid is supplied through passage 264 to chamber 262 while withdrawing fluid through passage 266 from chamber 260, the piston 234 moves rearwardly or inwardly with respect to the cylinder housing; and when pressurized fluid is supplied through passage 266 to chamber 260 while withdrawing fluid from chamber 262 through passage 264 the piston 234 moves forwardly or outwardly with respect to the cylinder housing. In the embodiment of FIGS. 9–10, the front end of the cylinder housing is closed by a front end wall 211*e* so that the piston 234 is at all times contained within the hollow of the cylinder housing and the pressure cylinder includes a work positioning member 280 secured to the upper face of the piston 234 and guiding in a longitudinally extending central slot or opening 211*f* in the upper wall of the cylinder housing side wall 211*a* so that a workpiece 282 suitably secured to the work positioning member 280 will be selectively positioned forwardly and rearwardly by the selective forward and rearward movement of piston 234 within housing 210.

All of the disclosed embodiments will be seen to provide several important advantages as compared to prior art pressure cylinders. Specifically, for shorter stroke cylinders, the overall length of the pressure cylinder may be decreased as compared to conventional pressure cylinders; since the rod in each case is located remotely from the entrance to the bore of the cylinder it is virtually impossible for abrasives to reach the rod seal whereby to optimize rod seal life; since the rod seals are essentially unloaded by virtue of their positioning at the interface of the end wall of the piston and the rod portion of the core member, rod seal life is again improved; since the piston and bore of the cylinder housing have a large area extensive interface the piston can withstand off-center loading without causing binding or extreme wear of the piston within the bore of the cylinder; since the piston has a large area end face for engagement with the workpiece, the workpiece may be raised to a raised work position and maintained in that position without the use of further outrigger guidance to ensure the stability of the raised load; since the interface between the piston and the cylinder housing is not exposed to fluid pressure, switch means may be readily provided in the cylinder housing to determine the limit positions of the piston without need to provide seals to seal the switches from the pressure fluid of the pressure cylinder; since there is no pressure fluid at the interface of the piston and the cylinder housing, the round section piston may be readily guided, either linearly or in rotational fashion, by a simple pin structure secured to the housing and engaging a slot in the outer periphery of the piston; and since there is no pressure fluid at the interface of the piston and the cylinder housing, an aperture may be provided in the cylinder housing sidewall for receipt of a work positioning member secured to the piston so that a workpiece may be secured to the work positioning member exteriorly of the pressure cylinder to allow the pressure cylinder to work in the manner of a rodless piston to move the workpiece back and forth in response to back and forth movement of the piston of the pressure cylinder.

Whereas preferred embodiments of the invention has been illustrated and described in detail, it will be apparent that various changes may be made in the disclosed embodiments without departing from the scope or spirit of the invention.

We claim:

1. A pressure cylinder comprising a housing including a rear wall and defining a blind bore having a central axis and extending forwardly from the rear wall and opening at a front end of the housing; and a piston having a cross-sectional configuration corresponding to the cross-sectional configuration of the cylinder bore and mounted for axial sliding movement in the cylinder bore along said axis in response to introduction of pressurized fluid between a retracted position and an extended position in which a front end of the piston extends beyond a front end of the cylinder bore, characterized in that the cylinder bore has a constant diameter throughout its length, the piston defines a hollow defining a piston bore, the cylinder includes a core member including a central rod portion extending through a wall of the piston and into the piston bore, and a piston portion slidably mounted in the piston bore and dividing the piston bore in a forward pressure chamber and a rearward pressure chamber, a first passage extends axially through the core rod portion and opens at its rear end externally of the cylinder housing and at its forward end in the forward pressure chamber, a second passage extends axially through the core rod portion and opens at its rear end externally of the cylinder housing and opens at its forward end in the rearward pressure chamber, the pressurized fluid is introduced into the forward pressure chamber through the first passage and introduced into the second pressure chamber through the second passage, the housing is configured such that there are no points on the housing along said axis forwardly of the piston, the piston has a constant diameter throughout its length corresponding to the diameter of the cylinder bore, the piston defines a sliding and contiguous interface with the cylinder bore over substantially the entire peripheral surface of the piston, the area between the rear wall of the piston and the rear wall of the cylinder housing is maintained at atmospheric pressure at all times, and the contiguous interface between the piston and the cylinder bore is devoid of fluid seals.

2. A pressure cylinder according to claim 1 wherein the housing defines a rectangular bore and the piston has a rectangular cross-sectional configuration corresponding to the cross-sectional configuration of the bore.

3. A pressure cylinder comprising a housing including a rear wall and defining a blind bore having a central axis and extending forwardly from the rear wall and opening at a front end of the housing; and a piston having a cross-sectional configuration corresponding to the cross-sectional configuration of the cylinder bore and mounted for axial sliding movement in the cylinder bore along said axis in response to introduction of pressurized fluid between the retracted position and an extended position in which a front end of the piston extends beyond a front end of the cylinder bore, characterized in that the cylinder bore has a constant diameter throughout its length, the piston defines a hollow, the pressurized fluid is introduced into the hollow of the piston, the housing is configured such that there are no points on the housing along said axis forwardly of the piston, the piston has a constant diameter throughout its length corresponding to the diameter of the cylinder bore, the piston defines a sliding and contiguous interface with the cylinder bore over substantially the entire peripheral surface of the piston, the area between the rear wall of the piston and the rear wall of the cylinder housing is maintained at atmospheric pressure at all times, and the contiguous interface between the piston and the cylinder bore is devoid of fluid seals.

4. A pressure cylinder comprising a housing defining a blind bore opening in the front end of the housing and a piston having a cross-sectional configuration corresponding to the cross-sectional configuration of the bore and mounted for sliding movement in the bore in response to an introduction of pressurized fluid between a retracted position and an extended position in which a front end of the piston extends beyond the front end of the bore, characterized in that the piston defines a bore, the pressurized fluid is introduced into the piston bore through a core member extending through the rear end of the cylinder and into the cylinder bore to dispose the forward end of the core within the piston bore, and the core member is mounted in the rear end the cylinder with a loose fit so as to allow the forward end of the core member to move radially to align itself squarely with the piston bore irrespective of manufacturing tolerances.

5. A pressure cylinder comprising a housing having an annular side wall defining a bore and a piston having a cross-sectional configuration corresponding to a cross-sectional configuration of the bore and mounted for sliding movement in the bore in response to an introduction of pressurized fluid, characterized in that the piston defines a hollow, the pressurized fluid is introduced into the hollow of the piston, and a switch is positioned in an opening in the side wall of the housing for coaction with switch means on the piston.

6. A pressure cylinder comprising a housing defining a bore and a piston having a cross-sectional configuration corresponding to a cross-sectional configuration of the bore and mounted for sliding movement in the bore in response to an introduction of pressurized fluid, characterized in that the piston defines a hollow, the pressurized fluid is introduced into the hollow of the piston, a slot is provided in the housing opening in the bore and exteriorally of the housing, and a work positioning member is positioned in the slot and secured to the piston so as to move in the slot in response to sliding movement of the piston in the bore.

7. A pressure cylinder comprising a housing defining a bore and a piston having a cross-sectional configuration corresponding to a cross-sectional configuration of the bore and mounted for sliding movement in the bore in response to an introduction of pressurized fluid, characterized in that the piston defines a hollow, the pressurized fluid is introduced into the hollow of the piston, a slot is provided in the housing which opens in the bore and exteriorally of the housing, and a work positioning member is positioned in the slot and secured to the piston so as to move in the slot in response to sliding movement of the piston in the bore.

8. A pressure cylinder comprising a housing defining a blind bore opening in a front end of the housing and a piston having an outer peripheral side wall having a cross-sectional configuration corresponding to the cross-sectional configuration of the bore and mounted for axial sliding movement in the bore in response to an introduction of pressurized fluid between a retracted position and an extended position in which a front end of the piston extends beyond the front end of the bore, characterized in that the piston defines a hollow, the pressurized fluid is introduced into the hollow of the piston, a cavity is provided in the housing opening in the bore, a switch is positioned in the housing cavity in confronting relation to the outer peripheral side wall of the piston, and means on the outer peripheral side wall of the piston coact with the switch to provide an indication of the axial position of the piston in the bore.

9. A pressure cylinder according to claim 8 wherein the switch is a proximity switch and the coacting means on the piston comprise indicia on the piston sensible by the proximity switch.

10. A pressure cylinder according to claim 9 wherein the piston indicia comprises a member protruding outwardly from the outer peripheral surface of the piston.

11. A pressure cylinder according to claim 8 wherein the cavity comprises an opening extending through the housing and opening at its outer end in an exterior surface of the housing.

12. A pressure cylinder according to claim 8 wherein a plurality of axially spaced switches are mounted in the opening and each switch comprises a proximity switch.

13. A pressure cylinder according to claim 12 wherein the opening comprises an axially elongated slot and the switches are mounted for individual axial adjustment in the slot.

14. A pressure cylinder comprising a housing defining a circular bore and a piston having an outer peripheral side wall having a circular cross-sectional configuration corresponding to a cross-sectional configuration of the bore and mounted for axial sliding movement in the bore in response to an introduction of pressurized fluid, characterized in that the piston defines a hollow, the pressurized fluid is introduced into the hollow of the piston, an area between a rear wall of the piston and a rear wall of the cylinder housing is maintained at atmospheric pressure at all times an axially extending groove is provided in the outer peripheral surface of the piston, and a guide pin is mounted in the housing and includes an inner portion extending into the piston groove to guide in the groove and preclude rotation of the piston.

15. A pressure cylinder according to claim 14 wherein the housing includes an opening opening at its inner end in the bore and opening at its outer end in an outer periphery of the housing and the guide pin is removably mounted in the opening.

* * * * *